(12) United States Patent
Essaian et al.

(10) Patent No.: US 7,724,797 B2
(45) Date of Patent: May 25, 2010

(54) SOLID-STATE LASER ARRAYS USING NONLINEAR FREQUENCY CONVERSION IN PERIODICALLY POLED MATERIALS

(75) Inventors: Stepan Essaian, San Jose, CA (US); Andrei Shchegrov, Campbell, CA (US)

(73) Assignee: Spectralus Corporation, Santa Clara, CA (US)

( * ) Notice: Subject to any disclaimer, the term of this patent is extended or adjusted under 35 U.S.C. 154(b) by 408 days.

(21) Appl. No.: 11/788,917

(22) Filed: Apr. 23, 2007

(65) Prior Publication Data

US 2007/0253453 A1 Nov. 1, 2007

Related U.S. Application Data

(60) Provisional application No. 60/795,211, filed on Apr. 27, 2006.

(51) Int. Cl.
*H01S 5/00* (2006.01)
(52) U.S. Cl. .......................... 372/50.12; 372/70
(58) Field of Classification Search ............... 372/12, 372/10, 22; 385/4, 49
See application file for complete search history.

(56) References Cited

U.S. PATENT DOCUMENTS

| | | | |
|---|---|---|---|
| 5,117,126 A * | 5/1992 | Geiger | 359/330 |
| 5,402,154 A | 3/1995 | Shibaguchi et al. | |
| 5,488,619 A * | 1/1996 | Injeyan et al. | 372/12 |
| 5,513,196 A * | 4/1996 | Bischel et al. | 372/22 |
| 5,940,419 A * | 8/1999 | Xie | 372/22 |
| 6,175,578 B1 * | 1/2001 | Ito | 372/10 |
| 2004/0208602 A1 | 10/2004 | Plante | |
| 2008/0317072 A1 | 12/2008 | Essaian et al. | |

* cited by examiner

*Primary Examiner*—Minsun Harvey
*Assistant Examiner*—Tuan N. Nguyen
(74) *Attorney, Agent, or Firm*—Wallace IP, PLC; Kevin Pontius

(57) ABSTRACT

A compact solid-state laser array for nonlinear intracavity frequency conversion into desired wavelengths using periodically poled nonlinear crystals. The crystals contain dopants such as MgO and/or have a specified stoichiometry. A preferred embodiment comprises a microchip laser cavity that includes a solid-state gain chip, such as $Nd:YVO_4$, which also provides polarization control of the laser; and a periodically poled nonlinear crystal chip such as PPMgOLN, for efficient frequency doubling of a infrared laser pump beam into the visible wavelength range. The described designs are especially advantageous for obtaining low-cost green and blue laser sources. The use of such high-efficiency pumps and nonlinear materials allows scaling of a compact, low-cost architecture to provide high output power levels in the blue/green wavelength range.

27 Claims, 7 Drawing Sheets

SOLID-STATE LASER ARRAYS USING NONLINEAR FREQUENCY CONVERSION IN PERIODICALLY POLED MATERIALS

PRIORITY INFORMATION

This application claims priority from commonly assigned U.S. Provisional Application US60/795,211, filed Apr. 27, 2006

FIELD OF THE INVENTION

This invention relates to novel solid-state laser arrays which utilize non-linear frequency conversion by periodically poled materials

BACKGROUND OF THE INVENTION

Compact and low-cost visible laser sources with Watt-level power outputs have long been desired, especially for consumer electronics applications. One application that would be enabled by such laser sources is projection displays, either in rear-projection (TV) or front-projection format. The advantages of laser sources over traditional, bulb-based sources, are numerous. They include wider wavelength gamut, longer lifetime, higher throughput efficiency of the projection light engine due to low etendue and linear polarization of the laser light source.

Of the three basic colors (red, green, and blue, or RGB) required for projection display applications, green color has been the most challenging. The reason is the lack of commercially viable semiconductor materials that can provide direct lasing in the green wavelength. The most efficient semiconductor lasers rely on material systems such as InGa(Al)P that lase most efficiently in the near-infrared spectral region. In the visible spectrum, efficient operation down to ~650 nm in the red wavelength regime can be achieved and semiconductor laser designs can be extended down to ~635 nm with somewhat decreased efficiency and reliability. On the shorter wavelength side, GaN-bases material systems have been under intense development in recent years and semiconductor laser products in the violet (~400 nm to ~445 nm) spectral range have been commercialized. For these lasers, achieving longer wavelengths i.e., >470 nm in an efficient and reliable way represents a nearly insurmountable challenge. Thus, the majority of the visible spectrum (between ~470 nm blue and ~635 nm red) does not have an efficient semiconductor laser solution.

In non-consumer-electronics (scientific, instrumentation, etc) or lower-power applications (laser pointers), green laser sources have been developed using a diode-pumped solid-state laser platform with nonlinear frequency doubling. Since the 1990s, the indirect solution for the green laser source, available in non-consumer-electronics (scientific, instrumentation, etc) or lower-power applications (laser pointers) has been based on nonlinear frequency doubling (also known as second-harmonic generation, or SHG) of neodymium (Nd)-based solid-state lasers, such as Nd:YAG or Nd:YVO$_4$. These solid-state gain materials can be pumped by infrared semiconductor lasers (e.g., at ~808 nm) to produce laser radiation at ~1064 nm wavelength. This radiation can then be frequency doubled into the green 532 nm wavelength using such nonlinear crystals as KTP or LBO. Similar technique can be used to obtain the blue wavelength such, e.g. 473 nm by frequency-doubling a 946 nm solid-state laser. A review of such approaches can be found in the book by W. P. Risk, T. R. Gosnell and A. V. Nurmikko, "Compact Blue-Green Lasers", Cambridge University Press (2003).

The main obstacle in bringing the frequency-doubled, diode-pumped solid-state laser platform to mass manufacturing is its high cost and lack of scalability. While low-power green lasers (e.g., laser pointers) can be obtained with relative ease, scaling power to achieve Watt-level output typically requires costly cavity designs with multiple optical components, cooling modules with separate temperature controls, and large package dimensions.

Several ideas to overcome these limitations have been proposed. One concept relies on optically pumping a thin layer of semiconductor gain material, instead of a solid-state laser material, and intracavity frequency doubling the infrared laser radiation into the visible wavelength spectrum (A. Caprara, J. L. Chilla, L. A. Spinelli, "Intracavity frequency-converted optically-pumped semiconductor laser," U.S. Pat. No. 6,167,068). This optically pumped semiconductor laser platform allows obtaining high power output in the blue-green spectral range, but still requires traditional, high-cost laser cavity architectures. This is a serious obstacle in using this platform in mass manufacturing. Another approach is using electrically pumped vertical extended cavity semiconductor lasers or laser arrays (Published US Patent Application 2006/0,029,120). The manufacturability of this platform is higher compared to the optically pumped lasers, because of the integrated nature of the pump and the gain in a single chip. However, this integrated nature is also a limiting factor and it makes it more difficult for electrically pumped lasers to reach the high power and high efficiency levels required in mass-producible devices for consumer markets.

Comparing the surface-emitting semiconductor laser and solid-state laser platforms for their use in producing green or blue wavelengths via nonlinear frequency doubling (or second-harmonic generation, frequently abbreviated as SHG), one can conclude that the solid-state laser platform is advantageous due to its higher gain, especially at the 1064 nm wavelength that can be readily converted into 532 nm green via SHG. However, increasing output power of the visible solid-state laser source while keeping the platform simple and low-cost has proven to be a much bigger challenge than it is for surface-emitting semiconductor laser.

One solid-state laser platform that could address both issues of mass manufacturability at low cost and scaling to high power levels is the so-called microchip laser platform. Originally described in the early 1990s (U.S. Pat. No. 5,365,539), this platform offers a compact, alignment-free laser cavity which comprises the gain crystal (such as Nd:YAG) and the nonlinear crystal, such as KTP (Potassium Titanium Oxide Phosphate, or KTiOPO$_4$). The microchip laser platform is manufacturable at low-cost. It can also be scaled to high power levels by extending the microchip concept from a single emitter to multiple emitters, i.e. laser array. This was also described in U.S. Pat. No. 5,115,445, and later, in Published US Patent Application 2002/0,186,731.

However, despite the described advantages of these laser sources, their introduction to large-volume consumer-electronic markets did not happen, except at very low power levels as in laser pointers. One reason for this is the low efficiency of the overall green laser module (although hereinafter we will generally be referring to the green wavelength of 532 nm wavelength for description clarity, most of the description also applies to other frequency-doubled wavelengths, such as 473 nm blue).

Indeed, most low-cost single-emitter green laser sources have electrical-to-optical conversion efficiencies on the order of a few percent. Ignoring the power requirements of cooling modules, one can make the following illustrative estimate. It is known to use 808 nm edge-emitting lasers producing several hundreds of milliwatts (say, 300-500 mW) to produce only about 5-10 mW of green wavelength with a Nd:YVO4 gain crystal and a KTP nonlinear crystal. Thus, even the optical-to-optical conversion efficiency is generally in the range of 1-3%. Assuming 50% power conversion efficiency for the pump diode, we find that the overall electrical-to-optical efficiency is on the order of 1-2%. Trying to scale such low-efficiency single-emitter laser sources to achieve a several-Watt output power could result in ~100 W of heat generated per 1 W of visible output. Several problems will immediately arise due to such inefficiency. One is keeping the platform compact and simple, since one will necessarily have to isolate the emitters sufficiently for best thermal performance. Another is dissipating such large amounts of heat without high-cost means such as using large chillers, etc.

Analyzing the root causes of low efficiency, one can understand that the conventional platform based on nonlinear materials such as KTP (more efficient) or LBO (less efficient) lacks the high conversion efficiency into the second-harmonic wavelength (e.g., green). Attempts to solve this problem were made by increasing the fundamental laser power and still using the KTP crystal. One example of such work can be found in the paper by Y-F. Chen, T-M. Huang, C-L. Wang, and L-J. Lee, "Compact and efficient 3.2-W diode-pumped Nd:YVO4/KTP green laser," Applied Optics, vol. 37, p. 5727 (1998). The paper reported optical-to-optical (808 nm to 532 nm) conversion efficiency of 25%. However, one can also conclude that this was achieved in a platform that had to give up the advantages of low-cost and scalability. Some examples are fiber-coupled pump diode output (high-cost), curved mirror requiring active alignment (high cost and not scalable to arrays), cooling of crystal to 17° C. (high cost).

Another problem, which prevents this platform from providing a reliable product, is the low reliability of KTP crystals at the high power density levels in the green wavelength range. It is known that KTP crystals develop high-absorption areas in and around the green beam propagation path and therefore this phenomenon does not allow the use of KTP in high-power applications. The bulk nonlinear material that is normally used for high power green laser sources is LBO, but its nonlinear conversion efficiency is an order of magnitude lower than KTP's conversion efficiency. Therefore, LBO and other low-efficiency bulk nonlinear materials are not useful for low-cost, high-power applications.

In summary, despite the many advantages of solid-state lasers, conventional solutions for frequency-doubled visible solid-state laser sources cannot be engineered for high-power, low-cost, manufacturable, and reliable consumer-electronics products. The engineering problems are fundamental and multiple design goals (primarily, high power, low cost, and reliability) cannot be met at the same time. It must also be noted that the low efficiency limitation mentioned earlier is also a big factor for a surface-emitting semiconductor laser platform, which is typically less efficient compared to the 1064 nm solid-state laser platform.

DETAILED DESCRIPTION OF THE INVENTION

Figure 1A:
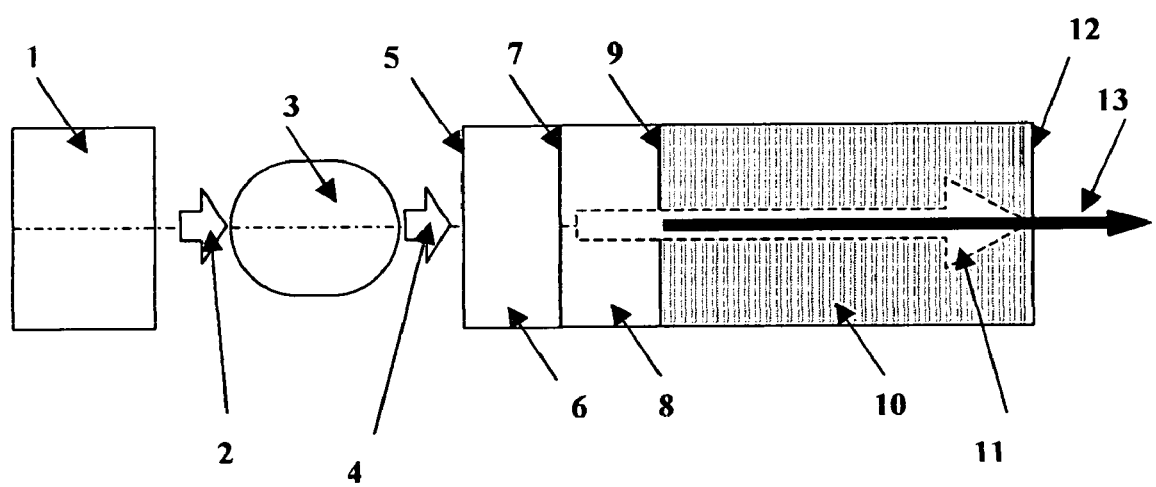
FIGS. 1a and 1b shows one preferred micro-chip array embodiment of the present invention

The present invention achieves a high-power, low-cost, visible laser array platform that uses a new family of periodically poled (as opposed to bulk), nonlinear crystals. These crystals include periodically poled, MgO-doped lithium niobate (PPMgOLN), periodically poled, MgO-doped lithium tantalate (PPMgOLT), periodically poled, ZnO-doped lithium niobate (PPZnOLN), periodically poled, ZnO-doped lithium tantalate (PPZnOLT), periodically poled stoichiometric lithium niobate (PPSLN), and periodically poled stoichiometric lithium tantalate (PPSLT), periodically poled MgO and ZnO doped near-stoichiometric lithium niobate (PPMgOSLN, PPZnOSLN), and periodically poled MgO and ZnO doped near-stoichiometric lithium tantalate (PPMgOSLT, PPZnOSLT)

To illustrate the advantages of such materials for a high-power, low-cost laser array platform, one should first consider their high nonlinearity. The nonlinear coefficient (describing SHG to produce the green wavelength) for PPMgOLN is typically ~15-16 pm/V compared to ~3.5 pm/V for KTP (which is the most efficient of the bulk nonlinear materials). As a result, the nonlinear conversion efficiency for PPMgOLN (which scales as a square of the nonlinear coefficient) exceeds the efficiency provided by KTP by an order of magnitude.

The advantage of higher nonlinear conversion efficiency is significant toour laser platform and allows scaling it to higher power levels in arrays while keeping a simple, low-cost laser design. To illustrate this fact, one can again consider the efficiency example provided above for KTP-based green lasers. Using a high-efficiency nonlinear material such as PPMgOLN allows one to obtain a compact, green laser source with electrical-to-optical efficiency of ~10-20% and optical-to-optical (808 nm to 532 nm) conversion efficiency of ~20-30%, which therefore exceed the efficiency of KTP-based green laser sources by an order of magnitude. For example, an ~2 W pump 808 nm diode is capable of producing ~500 mW in the green wavelength with PPMgOLN. Obtaining such a high power and efficiency level from a compact single-emitter allows scaling this platform to an array format without excessive (high-cost) heat dissipation demands.

Regarding the use of periodically poled nonlinear materials in solid-state lasers, it should be noted that their potential has been previously reported: (F. Laurell, U.S. Pat. No. 6,259, 711) described the use of periodically poled crystals such as PPKTP and PPLN in a microchip, single-emitter geometry. However, there are several critical limitations in Laurell's proposed platform that make it unsuitable for high-power, visible laser sources. First, the concept was not extended to arrays. Second, his choice of nonlinear materials is not suitable for high power application. The periodically poled materials described in Laurell's patent allow periodic poling for conversion into the visible light wavelength but suffer from reliability limitations. Like bulk KTP, periodically poled KTP can perform well at low power levels (a few milliwatts or ten of milliwatts in the visible) but suffers from both passive and induced absorption ("gray tracking") at higher power levels. In addition, KTP crystal production is not easily scalable to mass quantities at low cost as is required by some applications such as consumer-electronics displays. The materials $LiNbO_3$ and $LiTaO_3$ are amenable to high-volume production and can be periodically poled, but suffer from visible-light-induced degradation ("photo-refractive damage") that makes it impossible to use these crystals to produce even milliwatts of visible light without significant degradation. The photo-refractive damage can be reduced at elevated temperatures (>150° C.). However, this requires using ovens for controlling the temperature of the nonlinear crystals. While such ovens are available, they are incompatible with a low-cost, efficient laser design, especially in a microchip geometry. Thus, the laser designs described by Laurell, cannot be implemented in a low-cost, compact, and efficient architecture.

In contrast, the periodically poled nonlinear materials of the present invention rely on material dopants and/or a high degree of crystal stoichiometry that prevents crystal degradation even at room temperature.

Doping $LiNbO_3$ and $LiTaO_3$ with such impurities as MgO during crystal growth to suppress photo-refractive mechanisms has been proposed by several authors, e.g., by T. Volk, N. Rubinina, M. Wöhlecke, "Optical-damage-resistant impurities in lithium niobate," Journal of the Optical Society of America B, vol. 11, p. 1681 (1994). Growing the crystals with high degree of stoichiometry with or without dopants has been proposed: (Y. Furukawa, K. Kitamura, S. Takekawa, K. Niwa, H. Hatano, "Stoichiometric Mg:$LiNbO_3$ as an effective material for nonlinear optics," Optics Letters, vol. 23, p. 1892 (1998)). However, MgO-doped, stoichiometric $LiNbO_3$ and $LiTaO_3$ are very different materials from their congruent counterparts and their modified ferroelectric properties make these materials exceedingly difficult to pole into the short-period, several-micron-length domains, required for frequency conversion into the visible spectral range.

The technological challenges in the periodic poling of MgO-doped and/or stoichiometric $LiNbO_3$ and $LiTaO_3$ have recently been overcome and these new materials have proven to be readily manufacturable. Poling periods suitable for laser conversion into blue, green, and longer wavelength ranges have been produced and technology for such production process has been documented (Published US patent application 2005/0,133,477)

Apart from reliability considerations, the selection of $LiNbO_3$ and $LiTaO_3$-based (doped and/or stoichiometric) materials for periodic poling instead of such materials as KTP, RTA, etc. is also important for reasons of low cost and manufacturability. These factors are critical for products for the consumer electronics market. $LiNbO_3$ and $LiTaO_3$ can be grown in large boules, which can then be sliced into wafers for subsequent periodic poling. The cost of the final nonlinear element will benefit from the wafer-scale processing, similarly to the well-known manufacturing on silicon wafers in the semiconductor industry. This advantage of scalability is not present with materials like KTP which cannot be grown in large boules.

Thus, a laser array platform relying on high-efficiency solid-state gain crystals such as Nd:$YVO_4$ and on high-efficiency, high-reliability, and low-cost periodically poled nonlinear materials such as PPMgOLN offers advantages that cannot be achieved with previous platforms. The advantages are particularly important in the green wavelength region where there is no direct semiconductor laser solution. Fortunately, the 1064 nm solid-state laser wavelength is very efficient and allows building an efficient and scalable green laser source. For RGB (red, green, blue) display laser light sources, such green laser arrays can provide the wavelength unavailable from direct semiconductor diodes. In addition, the solid-state laser platform can also provide the blue wavelength, e.g. 473 nm, based on SHG of the 946 nm Nd:YAG line and such a solution will have advantages over GaN-based blue lasers which become less efficient and less reliable in the wavelength range >440 nm.

Yet another advantage of our novel laser technology is due to its array format. In applications such as projection displays, the high degree of coherence of the laser source is actually less desirable and creates an image-degrading interference phenomenon called speckle. Using multiple independent laser sources in an array format reduces the speckle contrast, which decreases as $1/\sqrt{N}$, where N is the number of emitters The use of laser arrays to reduce speckle has been disclosed, e.g. Published US Patent Application 2006/0,029,120, for the case of a surface-emitting semiconductor laser platform.

Figure 1B:
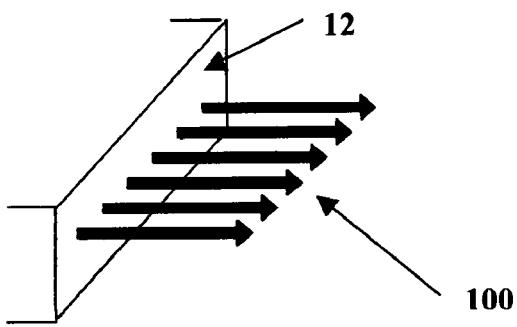

FIG. 1a illustrates one preferred embodiment of the present invention. The pump diode laser array 1, is emitting an array of beams 2, preferably at a wavelength between 800 and 900 nm, such as ~808 nm or 885 nm for efficient absorption into gain element 8. It must be understood that FIG. 1a provides a schematic, one-plane view of the laser design and illustrates the scalability of the present design to the array format. The array may be one-dimensional as illustrated in FIG. 1b (showing the array of generated second-harmonic beams) or two-dimensional. The one-dimensional case corresponds to a stripe (bar) of edge-emitting lasers, while the two-dimensional case corresponds to a stack of such bars. Both options have been developed and productized by semiconductor laser manufacturers.

Beam(s) 2 are sometimes highly astigmatic and beam-shaping optics 3 is used to convert the pump beam(s) 2 into the beam(s) 4 so that the beam(s) in the array 4 can form a circular cross-section of the desired diameter on surface 7 of gain element 8. This type of pumping scheme is known in the art and can efficiently overlap the pump area in the gain crystal with the intracavity circulating beams, which should be a single-spatial mode (or $TEM_{00}$) for efficient nonlinear frequency doubling. A suitable diameter for the pump spot on the gain element 8 is in the range of 100 to 300 microns. The beam-shaping optics can be an array of micro-lenses (e.g., aspheric microlenses), an array of gradient-index lenses, or a combination of such optical elements. When efficiency can be sacrificed in favor of simplicity and compactness, the beam-shaping optics 3 can be eliminated. Another part of the element assembly 3 may be a volume Bragg grating used to narrow down the spectral emission of the diode laser 1. Narrowing down the spectral output of the pump laser may be beneficial for the efficiency of the solid-state laser. Methods to achieve such spectral narrowing have been described, e.g., in the paper by L. Glebov. "Optimizing and Stabilizing Diode Laser Spectral Parameters." Photonics Spectra, Jan. 2005.

However, obtaining high laser source efficiency is important for the present invention. To maximize efficiency, we use a transparent optical material 6, which has a high thermal conductivity. Thus, element 6 acts as a heat sink and is bonded to gain element 8. The surfaces 5 and 7 are coated for high transmission at the pump wavelength, e.g., around 808 nm. The coating of surface 7 also provides high reflectivity at the fundamental laser wavelength, such as 1064 nm, and serves as the first mirror of the solid-state laser cavity. The coating may be selected for lasing in the desired wavelength supported by the solid-state element 8, e.g. 1342 nm. In this instance, it is advantageous to reduce the reflectivity of this mirror (7) or the second cavity mirror 12 at the dominant laser transition (1064 nm in the case of Nd:YVO$_4$). Some examples of optically transparent heat sink material suitable for use as the element 8 include sapphire, undoped YVO$_4$, and undoped YAG. Of these elements, sapphire is the most efficient for heat sinking due to its high thermal conductivity and good thermal expansion match to Nd:YVO$_4$. In lower-power versions of the laser design of the present invention traditional heat sinking methods such as placing the gain element on a copper or another high-thermal-conductivity metallic mount are acceptable and are also within the scope of this invention.

The gain element 8 is preferably a Nd-doped crystal with a higher gain in one axis, such as Nd:YVO$_4$, Nd:GdVO$_4$, or Nd:YGdVO$_4$ so that the element 8 provides both gain and polarization control for the laser cavity. The level of Nd doping for maximizing laser efficiency in our invention will typically be in the range of 0.5% to 3% atm (atomic percent). The element 8 also provides the transverse mode control in the otherwise flat-flat laser cavity through gain-guiding and thermal lensing effects.

The nonlinear crystal 10 is a periodically poled nonlinear crystal that belongs to the family of doped or stoichiometric nonlinear materials that ensure reliable crystal operation at both the fundamental wavelength (typically, near-infrared) and at the second-harmonic wavelength (typically, visible). Specifically, these materials include PPMgOLN (periodically poled MgO-doped LiNbO$_3$), PPMgOLT (periodically poled MgO-doped LiTaO$_3$), PPZnOLN (periodically poled ZnO-doped LiNbO$_3$), PPZnOLT (periodically poled ZnO-doped LiTaO$_3$)), PPSLN (periodically poled stoichiometric lithium niobate) or PPSLT (periodically poled stoichiometric lithium tantalate). The levels of doping and stoichiometry are selected to suppress optical degradation effects such as photo-refractive damage and visible-light-induced infrared absorption (also knows as GRIIRA and BLIIRA for green and blue light, respectively). A discussion of this subject can be found in the paper by Y. Furukawa, K. Kitamura, A. Alexandrovski, R. K. Route, M. M. Fejer, G. Foulon, "Green-induced infrared absorption in MgO doped LiNbO$_3$," Applied Physics Letters, vol. 78, p. 1970 (2001). Methods of manufacturing such periodically poled crystals are described in pending, commonly assigned Published US patent application 2005/0,133, 477.

The poling period of the nonlinear crystal 10 is chosen to maximize the efficiency of the second-harmonic generation of the fundamental beams. For example, the poling period of PPMgOLN for frequency doubling of 1064 nm into 532 nm is ~7 microns. The effective nonlinear coefficient for such a material is about 16 pm/V and can be as high as 20 pm/V when a substantially perfect grating structure and material uniformity are achieved. The high nonlinearity and high reliability of nonlinear crystals are key advantages of the laser system of the present invention. Since the efficiency of nonlinear conversion scales with the square of the nonlinear coefficient, the use of such materials as PPMgOLN in lieu of traditional materials such as KTP (~3.5 pm/V for conversion into the green wavelength) or LBO (~1 pm/V) allows constructing more compact, less power consuming, and higher output power systems than traditional bulk materials would allow. An additional advantage of using periodically poled materials compared to, e.g. KTP, is that only a single polarization of the fundamental beam is necessary for the second harmonic generation process. In KTP (most widespread crystal for SHG into the green wavelength range), two orthogonal polarizations at the fundamental wavelength have to be excited in the crystal (this constitutes the so-called type-II phase-matched SHG) and this can cause the depolarization of the intracavity laser beam, and, therefore, for the loss of power and efficiency.

The use of optimal doping and stoichiometry for high reliability allows making reliable laser products without the need of expensive and space-consuming ovens to heat the nonlinear crystal to suppress its degradation. Finally, mass manufacturability of PPMgOLN and other crystals in this invention allows achieving mass production of compact visible laser arrays for high-volume consumer-electronics markets. The wavelengths not available through direct semiconductor diode lasers can be achieved.

Using nonlinear crystals with non-periodic (chirped) on non-parallel (fan-out) poling patterns is also within the scope of the present invention. Another advantage provided by the high efficiency of such materials as PPMgOLN is that they provide design flexibility. This means that the effective nonlinearity can be traded off for other parameters such a temperature or angular acceptance bandwidth for second-harmonic generation without significant penalty in generated second harmonic power. The reason is that the intracavity second harmonic generation is limited by the maximum amount of power the laser can emit at the fundamental wavelength. This was shown by Smith (R. Smith, "Theory of intracavity optical second-harmonic generation," IEEE Journal of Quantum Electronics, vol. 6, p. 215, (1970)). After the laser limitation is reached, increasing crystal nonlinearity, length, or beam focusing achieves no further increase in second harmonic power. While conventional bulk nonlinear crystals typically never reach this regime in continuous wave laser operation, the high-nonlinearity periodically poled crystals used in the present invention do reach it. As a result, this allows one to improve the cost and performance of laser array by decreasing nonlinear crystal length, modifying the poling pattern, and, especially, by using a low-cost, monolithic microchip laser cavity assembly which provides some efficiency limitations due to its inherent thermal gradients, even when the entire assembly is controlled as a whole. Thus, in a preferred embodiment, the nonlinear crystal 10 is bonded to the laser gain element 8, e.g. by mean of chemically activated direct bonding. The input surface 9 of the nonlinear crystal has a coating to ensure high transmission at the fundamental wavelength and high reflection at the second harmonic wavelength. This arrangement also prevents the generated visible light from entering the gain element, which can be detrimental to the laser operation. It should be noted that the methods of epoxy-free bonding, which are preferred in our invention, have seen significant progress recently, and, therefore, the monolithic assemblies disclosed here are readily manufacturable. A review of bonding techniques can be found in the paper by C. Myatt, N. Traggis, and K. Dessau, "Optical contacting grows more robust," Laser Focus World, Jan. 2005, p. 95.

The output surface 12 of the nonlinear crystal serves as the second mirror of the cavity. Therefore, it is preferably coated for high reflection at the fundamental laser wavelength and for high transmission at the second-harmonic wavelength. The longitudinal and lateral dimensions of the described arrangement are optimized for high efficiency as is known in the art of laser design. Typically, nonlinear crystal length need not exceed 5 mm to obtain hundreds of milliwatts of power at the 532 nm (green wavelength) wavelength. The optical beam 11 illustrates the array of intracavity laser beams at the fundamental wavelength. The beam shown illustrates the cavity mode propagating in a direction away from the gain element 8. The backward-propagating cavity mode overlaps this forward-propagating beam and, therefore, is not shown. Similarly, second-harmonic beams are generated in both the forward and backward directions. The backward-generated second-harmonic beams are reflected by optical surface 9 and are recombined with the forward-generated second-harmonic beam so that an array of beams 13 exits the laser cavity.

It must be noted that because both forward- and backward-generated second harmonic beams are coherent (i.e., have a definite phase relationship) with each other, they can optically interfere with each other, thereby reducing the efficiency of nonlinear conversion somewhat. Several methods to overcome this problem can be utilized in the practice of our invention. One approach is to control the crystal temperature (such as by controlling the temperature of the entire microchip assembly) and tune this temperature to achieve a compromise between maximizing interference to make it as close to constructive interference as possible and maximizing nonlinear conversion efficiency. When the laser cavity is long enough to operate in multiple longitudinal modes, another possibility is to rely on some longitudinal modes extinguishing themselves in the (partially) destructive interference, while other modes enhance the total second-harmonic output through a constructive interference.

Yet another advantage for the microchip assembly of our invention is the possibility to use periodically poled crystals that are thick enough to be easily handled and be bonded to other crystals. Until recently, the commonly accepted opinion was that such materials as PPMgOLN can only be poled in the form of thin wafers (0.5 mm thick or even thinner) for conversion into blue-green wavelengths if they can be poled at all in a production, non-research environment. Now, by using the method described in Published US patent application 2005/0,133,477, we have demonstrated the manufacture of crystals as thick as 1 mm in high yield. This is an important advantage for building a microchip laser.

One important design parameter that is specific to the array architecture is the lateral separation between individual emitters of the laser array. For obtaining a low cost laser source, it is advantageous to achieve the smallest possible separation between emitters. In this case, cost-saving will apply to the pump laser array, solid-state gain crystal, nonlinear crystal, and also the overall package. On the other hand, too small a separation between emitters will result in thermal cross-talk, higher temperature rise in the emitting areas, and, as a result, in a deteriorated, less-efficient laser array performance. Though thermal modeling and experiments, we have determined that a suitable emitter separation is on the order of 3-4 times the beam size and emitter-to-emitter distances on the order of 500-700 microns yield good performance. The exact fill factor for the laser array is determined by the choice of solid-state gain material, the material and quality of heat sinking, efficiency and heat dissipation of individual laser emitter, and similar thermal factors. For example, the solid-state gain crystal Nd:GdVO$_4$ has higher thermal conductivity than Nd:GdVO$_4$, therefore, it will allow a higher fill factor. Thus, by using the latest advances in crystal technologies, we have been able to obtain a novel laser array platform that surpasses existing platforms in its capabilities: power, efficiency, reliability, and cost.

Many elements and their functions in this and other embodiments are essentially the same as in the embodiment illustrated in FIGS. 1a and 1b. Therefore, only the differences will be highlighted in the subsequent description, while similarities can be understood from the description for FIG. 1.

Figure 2:
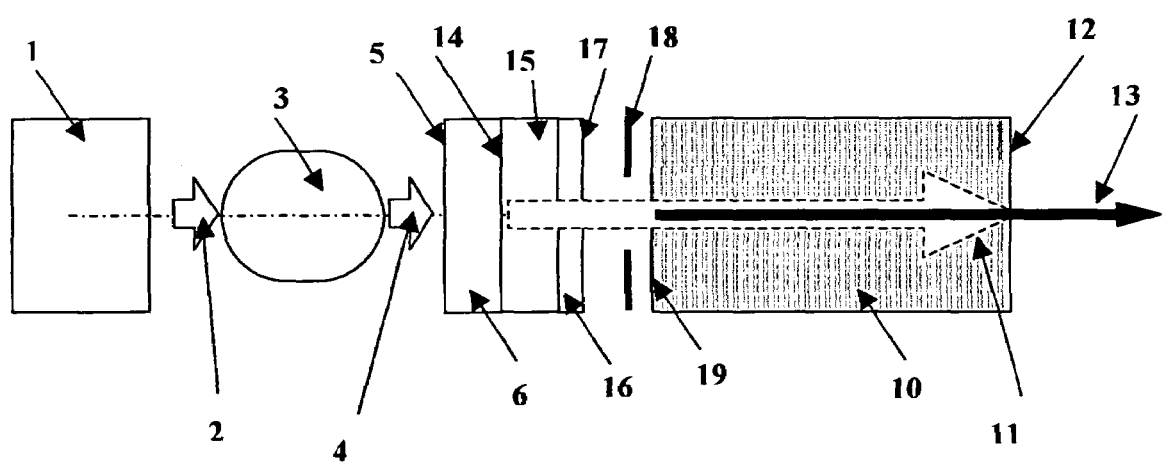
FIG. 2 shows an embodiment of the present invention with a gain medium that has no preferred polarization and a crystal with birefringent walk-off

The FIG. 2 embodiment is especially useful when the gain medium (element 15 in FIG. 2) does not have a preferred direction for polarization with higher gain. A well-known example of such gain media is Nd:YAG. One advantage of using Nd:YAG is that it can provide laser wavelengths, such as 946 nm, not available with Nd:YVO$_4$ or Nd:GdVO$_4$. This is desirable for obtaining other wavelengths by nonlinear frequency conversion, e.g. blue wavelength at 473 nm. Gain materials may be glass-based materials such as Yb:glass or Nd:glass, and, generally, other crystals and glasses (Yb:YAG, Nd:YLF, etc.).

While many of the elements and technical methods described in the embodiment of FIGS. 1a and 1b apply to FIG. 2, the design has to provide polarization control now via different means than the gain medium. Polarization control is a necessary part of the laser design since second-harmonic generation process is always polarization-sensitive. In order to preserve the low-cost, compact design concepts of this invention, the preferred embodiment of this invention utilizes an additional birefringent element 16. Element 16 is a birefringent crystal, suitable for intra-cavity laser design, cut at an angle to provide large walk-off between the two polarizations supported by this crystal. An example of a material suitable for the use in element 16 is undoped yttrium vanadate (YVO$_4$). The walk-off in the crystal 16 can be used to discriminate between the two polarization by, for example, using an array of apertures 18 (illustrated as a single aperture in FIG. 2), which provide higher loss to the unwanted polarization. While the illustration in FIG. 2 shows separate elements 15 (gain crystal), 16 (polarization control crystal for creating walk-off), 18 (an array of apertures), and 19 (nonlinear crystal), they can also be combined in a monolithic assembly. In this case, a significant walk-off is designed in so that the apertures can be aligned passively, i.e. before the laser is turned on. The other elements and coatings in FIG. 2 are similar to those in FIGS. 1a and 1b.

Figure 3:
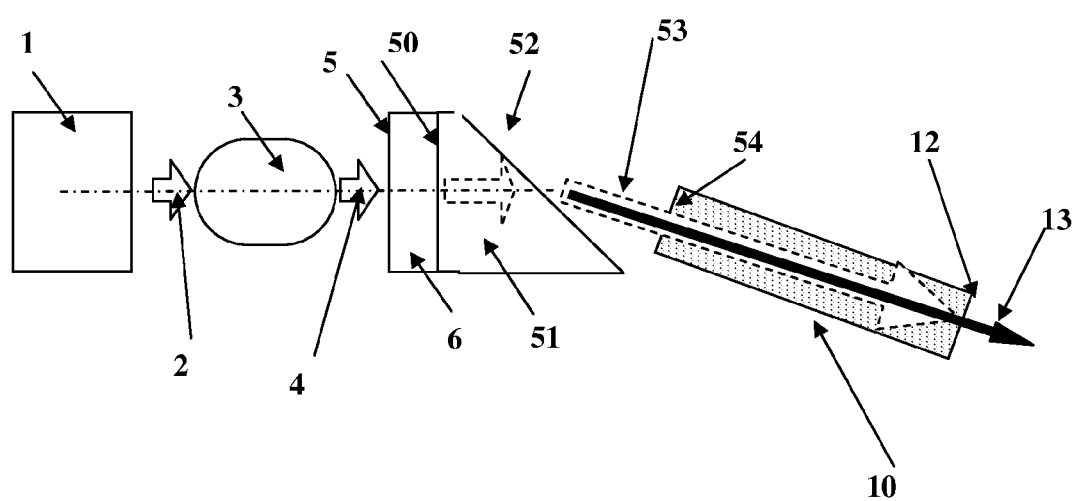
FIG. 3 shows an embodiment of the present invention with a gain medium that has no preferred polarization and an intracavity Brewster surface.

Like the embodiment of FIG. 2, the design of FIG. 3 is useful when the gain medium (element 15 in FIG. 2) does not have a preferred direction for polarization with higher gain. To control the laser array polarization for efficient nonlinear frequency doubling, this design relies on intracavity Brewster surface 52, which may be left uncoated. One way to obtain a Brewster surface in the cavity without adding extra elements is to cut the gain crystal 51 at the Brewster angle. As known, Brewster surfaces have high transmission for p-polarized light and lower transmission for s-polarized light. This fact can be used to lock the laser cavity operation in p-polarization only. The nonlinear periodically poled crystal 10 is now tilted at the appropriate angle to form the laser cavity. The crystal shown in FIG. 3 appears thinner than in the other figures. This is done to illustrate the fact that the thinner (wafer) cross-section of the periodically poled crystal will typically be in the plane of the drawing, when the Brewster surface is present.

Designs generally like that illustrated in FIG. 3 have been used in the past (see, e.g., World Patent Application WO2005/036,703), but did not take advantage of high-reliability, periodically poled crystals used in our invention and also did not utilize an array architecture. It must be understood that FIG. 3 illustrates only one possible embodiment of element arrangement with an intracavity Brewster surface. As in FIG. 1, this design can be monolithically built, e.g. by cutting the surface 54 of nonlinear crystal 10 at an angle and joining the gain element and the nonlinear crystal. In this case, the Brewster angle cut should be designed for the interface between optical materials 51 and 10 and not between either of these materials and air.

Figure 4:
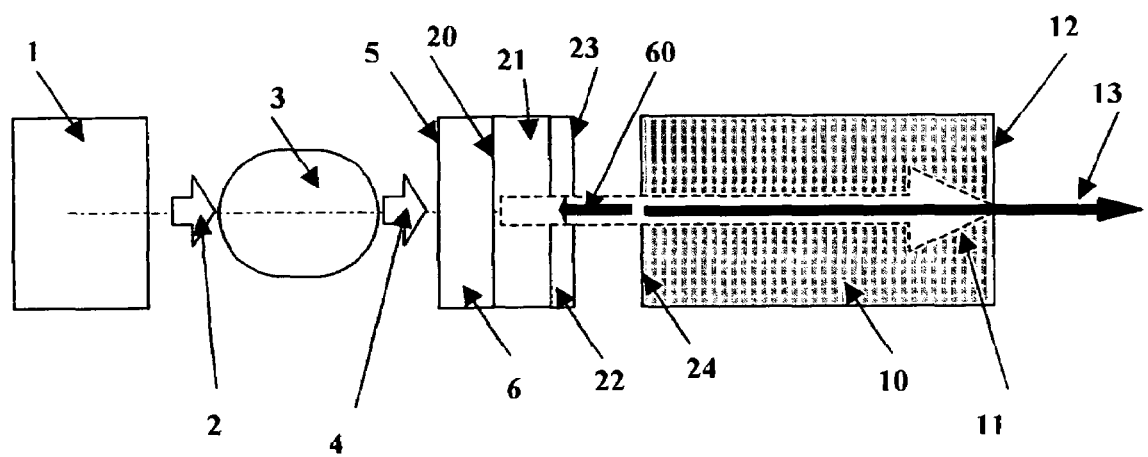
FIG. 4 shows an embodiment of the present invention with a gain medium that has preferred polarization and a waveplate for rotating polarization of backward-propagating second-harmonic beams

The FIG. 4 embodiment illustrates and addresses the optimization of second-harmonic power extraction. As was discussed in the description for FIG. 1, the second harmonic light is generated in two opposite directions of propagation. In many cases the backward-generated beams can be recombined with the forward-generated beams via a high-reflectivity mirror coating for the backward-generated beams and possible destructive interference between the two arrays of beams can be avoided by thermal adjustment or by using multi-longitudinal mode operation. However, in some cases it may be more efficient to use the design proposed in FIG. 4. Element 23 is a waveplate (made, e.g., from quartz) that rotates polarization of both fundamental and second-harmonic beams. In this design, the waveplate is selected in such a way that the polarization of the fundamental beams is rotated by 90 degrees after a single pass, and the polarization of the second harmonic beams is rotated by 45 degrees after a single pass. The waveplates of this type are called dual waveplates and are commercially available. The surface 23 is anti-reflection coated for both fundamental and second harmonic beams. The surface 22 is anti-reflection coated for the fundamental beams, and coated for high reflection for the second harmonic beams. Since the fundamental light traverses the waveplate twice in one cavity round trip, it does not change its polarization and thus the waveplate does not disturb the operation of the fundamental laser. However, the second harmonic light, which also traverses the waveplate twice, changes its polarization to the orthogonal one and returns back through the nonlinear crystal 10 (the surface 24 is now anti-reflection coated for both fundamental and second harmonic beams) without interference with the forward-generated second-harmonic beams. This design is especially useful in applications, for which the polarization of the output second harmonic beams is not critical. One application is using our novel laser for projection displays, which are based on digital light processing technology, as developed by Texas Instruments.

Figure 5:
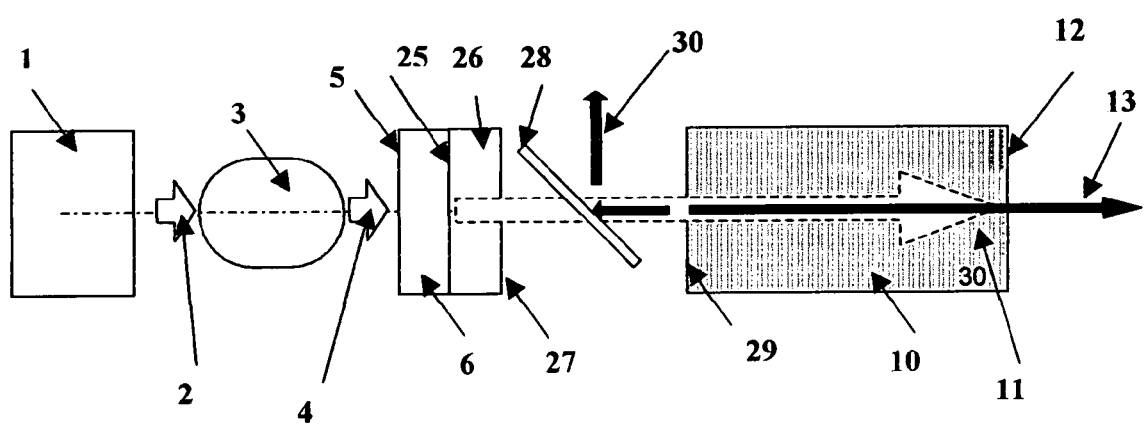
FIG. 5 shows an embodiment of the present invention with recovery of backward-propagating second-harmonic beams via a turning mirror

The embodiment of FIG. 5 illustrates another method to extract the backward-generated second-harmonic beams if the use of waveplates is not preferred. The extraction is now done via a coated turning mirror 28, which has a high reflection for the second harmonic light and high transmission for the fundamental light. One instance, when the "turning mirror design" of FIG. 5 may be preferred over the "waveplate design" of FIG. 4 is when the laser polarization is not locked by the gain element 6, e.g. when Nd:YAG is used. In this case, it is possible to also design polarization discrimination in the coatings of the element 28 so that only the laser is operating only in the desired polarization, providing efficient second-harmonic conversion. The re-directed, backward-generated second-harmonic beams 30 may be re-directed again by another low-cost mirror so it propagates in the same direction as the forward-generated second-harmonic beams. Unlike the design of FIG. 4, this design will produce an array of linearly-polarized second-harmonic beams. This is desirable for applications such as using the laser for projection displays, based on liquid-crystal spatial light modulators (such as LCD or LCOS).

Figure 6:
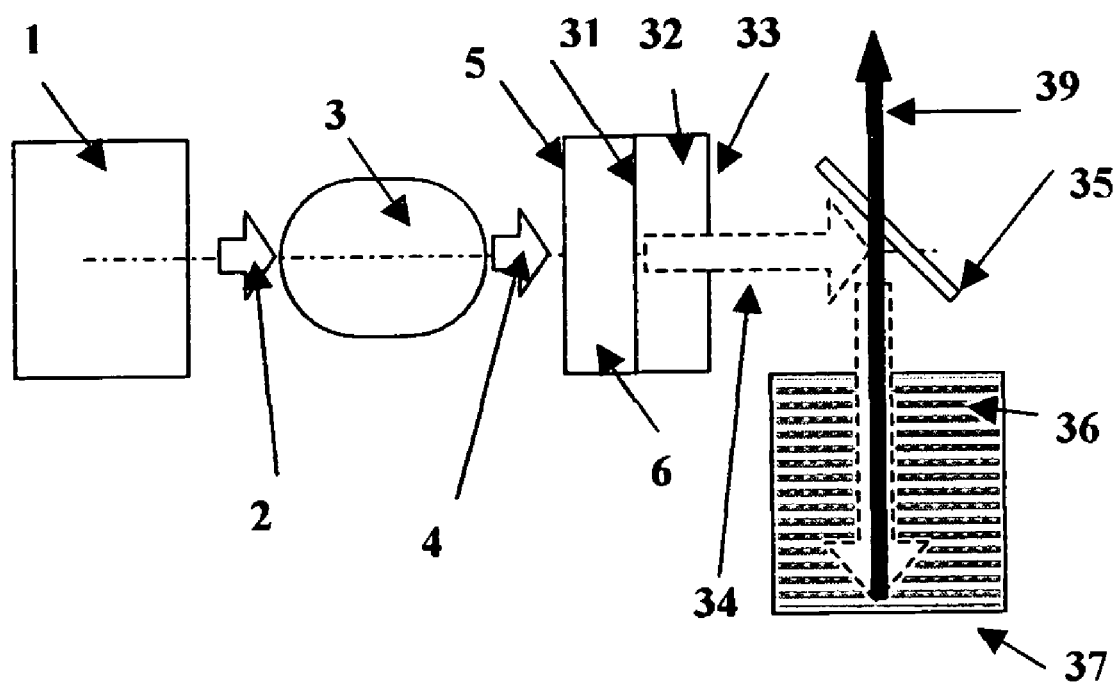
FIG. 6 shows an embodiment of the present invention with a folded cavity

The embodiment of FIG. 6 combines the forward- and backward-generated second-harmonic beams by reflecting the forward-generated beam from the surface 37 of nonlinear crystal 36. The coated glass plate 35 is preferably oriented at an angle of 45 degrees with respect to the gain crystal surface and is coated for high reflection at the fundamental laser wavelength and high transmission at the second-harmonic wavelength. An array of linearly polarized second-harmonic beams 39 is outcoupled from the surface 35. As was mentioned before, having a tilted surface in the cavity makes it easier to discriminate polarizations via designing polarization-selective coatings. This is advantageous for gain crystals that do not define laser polarization direction, such as a Nd:YAG crystal. Like other designs of this invention, this design is modular and can be combined with the ideas illustrated in other embodiments, e.g., with the "waveplate design" of FIG. 4 to rotate polarization of the array of second-harmonic beams. One alternative in this case is to use the waveplate to complete the cavity below surface 36, which will suitably be dual-band anti-reflection coated in this case.

Figure 7:
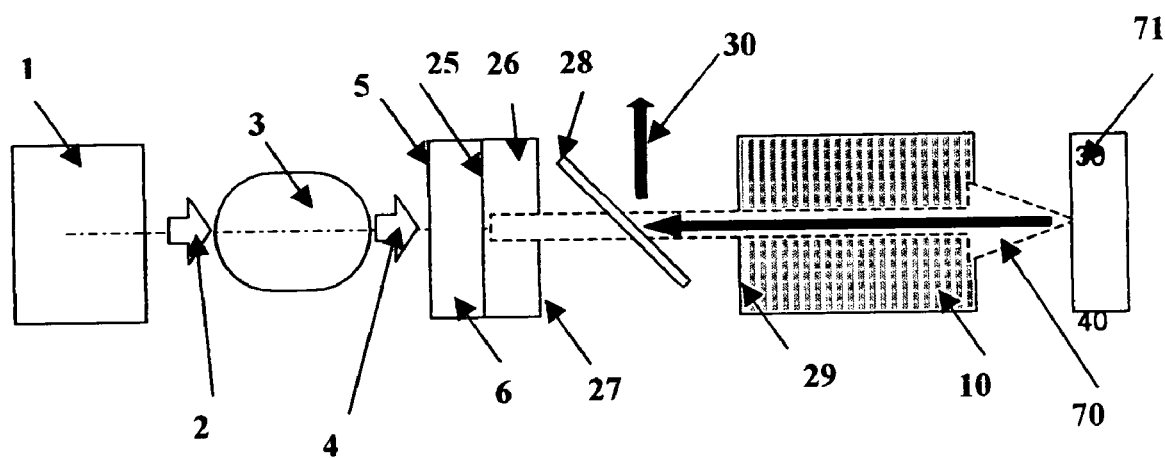
FIG. 7 shows an embodiment of the present invention with a saturable absorber

The invention embodiments in FIGS. 1-6 illustrate low-cost and compact laser array designs for continuous-wave (cw) operation. As will be apparent from FIG. 7, a compact and low-cost laser array design for a pulsed (passively Q-switched or passively mode-locked) operation can also be obtained while enjoying all the advantages of nonlinear crystals chosen in this invention. FIG. 7 illustrates the design of FIG. 5, modified for an operation with a saturable absorber 71. The element 71 is a solid-state or semiconductor saturable absorber. An example of the solid-state saturable absorber is $Cr^{4+}$:YAG (chromium doped yttrium aluminum garnet) and this and other saturable absorber crystals ($V^{3+}$:YAG, $Co^{2+}$:$MgAl_2O_4$). An example of a semiconductor-material-based saturable absorber is an epitaxially grown single quantum well or several quantum wells (e.g., based on InGaAs material structure). The quantum well absorber may be grown together with an epitaxial mirror stack, also known as a distributed Bragg reflector, or DBR. Similarly, the solid-state saturable absorber crystal may be coated with a mirror coating to define the second cavity mirror. The methods of passive Q-switching and mode locking are known in the art of laser design and can be found, e.g. in the following references: R. Paschotta and U. Keller, "Ever higher power from mode-locked lasers," Optics and Photonics News, p. 50, May 2003; D-H Lee et al., "Intracavity-doubled self-Q-switched Nd,Cr:YAG 946/473 nm microchip laser," Chinese Physics Letters, vol. 19, p. 504 (2002); J. J. Zayhowski, "Passively Q-switched microchip lasers and applications," Rev. Laser Eng., vol. 26, p. 841 (1998). Furthermore, the saturable absorber and the gain element can be combined in a single element 26, e.g., by co-doping YAG crystal with Nd and Cr.

A pulsed laser design may be advantageous in applications where cw operation is not required. An additional advantage of the pulsed laser array design is a much higher peak power in a pulse compared to the average power at the fundamental wavelength. This allows to further increase the efficiency of second harmonic generation and relaxes the temperature tolerance on the periodically poled nonlinear crystal. Furthermore, a design with active Q-switching may also be realized without significant increase in the cavity cost and complexity. It has been known for some time that standard (congruent) periodically poled lithium niobate (PPLN) and lithium tantalate (PPLT) can be used as electro-optical Q-switch elements. A recent discussion on the subject can be found in the paper by Y. H. Chen, Y. C. Huang, Y. Y. Ling, and Y. F. Chen, "Intracavity PPLN crystals for ultra-low-voltage laser Q-switching and high-efficiency wavelength conversion," Applied Physics B: Lasers and Optics, vol. 80, p. 889 (2005). Again, it is the preferred and advantageous embodiment of our invention to use periodically poled nonlinear materials with optimized doping or stoichiometry on which a reliable and efficient commercial laser product can rely. The illustration provided in FIG. 8 still is applicable to a compact, efficient, and reliable actively Q-switched laser array, where element 71 is now another periodically poled nonlinear crystal used as an electro-optic Pockels cell element, i.e. an electro-optic Q-switch.

The teaching of the following references are incorporated herein by this reference
1. W. P. Risk, T. R. Gosnell and A. V. Nurmikko, "Compact Blue-Green Lasers", Cambridge University Press (2003).
2. A. Caprara, J. L. Chilla, L. A. Spinelli, "Intracavity frequency-converted optically-pumped semiconductor laser," U.S. Pat. No. 6,167,068.
3. A. Mooradian, A. Shchegrov, and S. Anikitchev, "Coupled cavity high power semiconductor laser," US Patent Application 2006/0,029,120.
4. A. Mooradian, "Microchip laser," U.S. Pat. No. 5,365,539
5. A. Mooradian, "Microchip laser array," U.S. Pat. No. 5,115,445.
6. K-T. Um, H-B. Lee, K-Y. Um, "High powered laser," US Patent Application 2002/0,186,731.
7. F. Laurell, "Laser," U.S. Pat. No. 6,259,711
8. T. Volk, N. Rubinina, M. Wöhlecke, "Optical-damage-resistant impurities in lithium niobate," Journal of the Optical Society of America B, vol. 11, p. 1681 (1994).
9. Y. Furukawa, K. Kitamura, S. Takekawa, K. Niwa, H. Hatano, "Stoichiometric Mg:LiNbO$_3$ as an effective material for nonlinear optics," Optics Letters, vol. 23, p. 1892 (1998).
10. Spectralus Corporation Web Site: http:/twww.spectralus.com
11. S. Essaian, "Method for the fabrication of periodically poled lithium niobate and lithium tantalate nonlinear optical components," US patent application 2005/0,133,477.
12. Y. Furukawa, K. Kitamura, A. Alexandrovski, R. K. Route, M. M. Fejer, G. Foulon, "Green-induced infrared absorption in MgO doped LiNbO$_3$," Applied Physics Letters, vol. 78, p. 1970 (2001).
13. R. Smith, "Theory of intracavity optical second-harmonic generation," IEEE Journal of Quantum Electronics, vol. 6, p. 215, (1970).
14. C. Myatt, N. Traggis, and K. Dessau, "Optical contacting grows more robust," Laser Focus World, Jan. 2005, p. 95.
15. L. Glebov. "Optimizing and Stabilizing Diode Laser Spectral Parameters." Photonics Spectra, Jan. 2005.
16. R. Paschotta and U. Keller, "Ever higher power from mode-locked lasers," Optics and Photonics News, p. 50, May 2003;
17. D-H Lee et al., "Intracavity-doubled self-Q-switched Nd,Cr:YAG 946/473 nm microchip laser," Chinese Physics Letters, vol. 19, p. 504 (2002);
18. J. J. Zayhowski, "Passively Q-switched microchip lasers and applications," Rev. Laser Eng., vol. 26, p. 841 (1998).
19. Y. H. Chen, Y. C. Huang, Y. Y. Ling, and Y. F. Chen, "Intracavity PPLN crystals for ultra-low-voltage laser Q-switching and high-efficiency wavelength conversion," Applied Physics B: Lasers and Optics, vol. 80, p. 889 (2005).

The invention claimed is:

1. An optically pumped solid-state microchip laser array for providing a frequency doubled visible output, the microchip laser array comprising:
    two mirrors, defined by coated surfaces, the mirrors being spaced apart from one another to define ends of a laser cavity;
    a pump laser array providing pump energy;
    a solid-state gain element pumped by the pump laser array and disposed between the two mirrors; and
    a bulk, periodically poled nonlinear crystal disposed between the two mirrors to provide nonlinear doubling of the fundamental laser frequency, the crystal having a thickness in the range of 0.5 mm to about 1 mm and comprising material selected from the group consisting of: LiNbO$_3$ and LiTaO$_3$, and the crystal containing a dopant selected from the group consisting of: MgO and ZnO;
    wherein the gain element and the nonlinear crystal are in the form of a microchip monolithic assembly fabricated by bonding them together, wherein the solid state gain element comprises a crystal having a gain along one of its crystalline axes that is larger than its gain along its other crystalline axes, and
    wherein one of the two mirrors is a cavity front mirror disposed on an input face of the gain element and is coated onto the input face of the gain element to provide high reflection at the second harmonic frequency to thereby collect an array of backward-generated second harmonic beams.

2. The microchip laser array of claim 1, wherein the solid state gain element comprises a material selected from the group consisting of: Nd:YVO$_4$, Nd:GdVO$_4$, Nd:YGdO$_4$, Nd:YAG, Nd:YLF, Yb:glass, Yb:YAG, and Nd: glass.

3. The microchip laser array of claim 1, wherein the pump energy from the pump laser array is delivered to the gain element via a microlens.

4. The microchip laser array of claim 1, wherein the pump energy from the pump laser array is delivered to the gain element via a gradient index lens.

5. The microchip laser array of claim 1, wherein the pump energy from the pump laser is spectrally narrowed using a volume Bragg grating.

6. The microchip laser array of claim 1, wherein the periodically poled nonlinear crystal comprises material selected from the group consisting of:
    periodically poled MgO-doped LiNbO$_3$, periodically poled MgO-doped LiTaO$_3$, periodically poled ZnO-doped LiNbO$_3$, periodically poled ZnO-doped LiTaO$_3$, periodically poled MgQ-doped near-stoichiometric LiNbO$_3$, periodically poled ZnO-doped near-stoichiometric LiNbO$_3$, periodically poled MgO-doped near-stoichiometric LiTaO$_3$, periodically poled ZnO-doped near-stoichiometric LiTaO$_3$.

7. The microchip laser array of claim 1, wherein one of the two mirrors is a cavity end mirror disposed on an output face of the nonlinear crystal and is coated onto the output face of the nonlinear crystal to provide high reflection at the fundamental frequency and high transmission at the second harmonic frequency.

8. The microchip laser array of claim 1, wherein the solid state gain element is mounted on an optically transparent substrate having high thermal conductivity.

9. The microchip laser array of claim 1, wherein polarization in a desired polarization axis is achieved using a gain element comprising material selected from the group consisting of: Nd:YVO$_4$, Nd:GdVO$_4$, and Nd:YGdO$_4$.

10. The microchip laser array of claim 1, further comprising:
    a birefringent element with a large spatial walkoff between two supported polarizations;
    an array aperture;
    whereby polarization control is achieved by imposing higher loss to an undesired one of the polarizations by selective arrangement of the array aperture with respect to the birefringent element.

11. The microchip laser array of claim 1, further comprising:
    an intracavity Brewster surface formed as a part of the gain crystal and the nonlinear crystal, to achieve polarization control.

12. The microchip laser array of claim 1, further comprising an intracavity tilted and coated plate disposed between the two mirrors to extract an array of backward-generated second harmonic beams.

13. The microchip laser array of claim 12, wherein the intracavity tilted and coated plate locks the polarization of the laser array at the fundamental frequency.

14. The microchip laser array of claim 1, wherein the cavity is folded to achieve extraction of a second harmonic beam through a turning mirror.

15. The microchip laser array of claim 14, wherein the second harmonic beam is extracted from a tilted surface of the periodically poled nonlinear crystal.

16. The microchip laser array of claim 1, wherein the pump laser comprises a continuous wave laser.

17. The microchip laser array of claim 1, further comprising:
    a saturable absorber element disposed between the two mirrors;
    wherein the pump laser comprises a pulsed laser with pulsing obtained via passive Q-switching or passive mode-locking.

18. The microchip laser array of claim 17, wherein the saturable absorber element comprises a material selected from the group consisting of: $Cr^{4+}$:YAG, $V^{3+}$:YAG, and $Co^{2+}$:$MgAl_2O_4$.

19. The microchip laser array of claim 17, wherein the saturable absorber element comprises an epitaxially grown semiconductor structure.

20. The microchip laser array of claim 1, further comprising: an electro-optic Pockels cell having a periodically poled nonlinear material, wherein the laser array is operated in an actively Q-switched regime via the electro-optic Pockels cell.

21. The microchip laser array of claim 1, wherein one of the two mirrors is a cavity front mirror disposed on an input face of the nonlinear crystal and is coated onto the input face of the nonlinear crystal to provide high reflection at a second harmonic frequency to thereby collect a backward-generated second harmonic beam.

22. The microchip laser array of claim 1, wherein the periodically poled nonlinear crystal comprises material selected from the group consisting of: periodically poled stoichiometric $LiNbO_3$, periodically poled stoichiometric $LiTaO_3$, periodically poled MgO-doped near-stoichiometric $LiNbO_3$, periodically poled ZnO-doped near-stoichiometric $LiNbO_3$, periodically poled MgO-doped near-stoichiometric $LiTaO_3$, periodically poled ZnO-doped near-stoichiometric $LiTaO_3$.

23. The microchip laser array of claim 1, further comprising a temperature control.

24. The microchip laser array of claim 1, further comprising a lens disposed to condition the pump energy from the pump laser.

25. An optically pumped solid-state microchip laser array for providing a frequency doubled visible output, the microchip laser array comprising:
    two mirrors, defined by coated surfaces, the mirrors being spaced apart from one another to define ends of a laser cavity;
    a pump laser array providing pump energy;
    a solid-state gain element pumped by the pump laser array and disposed between the two mirrors; and
    a bulk, periodically poled nonlinear crystal disposed between the two mirrors to provide nonlinear doubling of the fundamental laser frequency, the crystal having a thickness in the range of 0.5 mm to about 1 mm and comprising material selected from the group consisting of: $LiNbO_3$ and $LiTaO_3$, and the crystal containing a dopant selected from the group consisting of: MgO and ZnO;
    wherein the two mirrors, the gain element, and the nonlinear crystal are spatially separated from one another and are mounted together on an optical bench platform; and
    wherein the cavity is folded to achieve extraction of a second harmonic beam through a turning mirror formed as a tilted surface of the periodically poled nonlinear crystal.

26. An optically pumped solid-state laser array for providing a frequency doubled visible output, the laser array comprising:
    two mirrors, defined by coated surfaces, the mirrors being spaced apart from one another to define ends of a laser cavity;
    a pump laser array providing pump energy;
    a solid-state gain element pumped by the pump laser array and disposed between the two mirrors;
    a bulk, periodically poled nonlinear crystal disposed between the two mirrors to provide nonlinear doubling of the fundamental laser frequency, the crystal comprising material selected from the group consisting of: $LiNbO_3$ and $LiTaO_3$, and the
    crystal containing a dopant selected from the group consisting of: MgO and ZnO; and
    a dual waveplate configured to leave unchanged the polarization of an array of fundamental frequency beams in a cavity round trip and to rotate the polarization of any backward-generated second harmonic frequency beams by 90 degrees and to reflect the second harmonic frequency beams to combine them with any forward-generated second harmonic frequency beams.

27. An optically pumped solid-state microchip laser array for providing a frequency doubled visible output, the microchip laser array comprising:
    two mirrors, defined by coated surfaces;
    a semiconductor diode laser array providing pump energy;
    a solid-state gain element pumped by the semiconductor diode laser array and disposed between the two mirrors; and
    a bulk, periodically poled nonlinear crystal disposed between the two mirrors to provide nonlinear doubling of the fundamental laser frequency, the crystal having a thickness in the range of 0.5 mm to about 1 mm and comprising material selected from the group consisting of: $LiNbO_3$ and $LiTaO_3$, and the crystal having a sufficient degree of stoichiometry to ensure high reliability of the crystal;
    wherein the gain element and the nonlinear crystal are in the form of a microchip monolithic assembly fabricated by bonding them together; and
    wherein one of the two mirrors is a cavity front mirror disposed on an input face of the nonlinear crystal and is coated onto the input face of the nonlinear crystal to provide high reflection at a second harmonic frequency to thereby collect a backward-generated second harmonic beam.

* * * * *